(12) United States Patent
Shew (10) Patent No.: US 7,004,357 B2
(45) Date of Patent: Feb. 28, 2006

(54) GREASE GUN

(75) Inventor: Jerry D. Shew, Charlotte, NC (US)

(73) Assignee: Alemite, LLC, Fort Mill, SC (US)

( * ) Notice: Subject to any disclaimer, the term of this patent is extended or adjusted under 35 U.S.C. 154(b) by 0 days.

(21) Appl. No.: 10/249,900

(22) Filed: May 15, 2003

(65) Prior Publication Data

US 2004/0226969 A1    Nov. 18, 2004

(51) Int. Cl.
*G01F 11/36* (2006.01)

(52) U.S. Cl. .................................. 222/256; 222/333
(58) Field of Classification Search ............... 222/256, 222/333, 383.1, 258
See application file for complete search history.

(56) References Cited

U.S. PATENT DOCUMENTS

| | | |
|---|---|---|
| 1,964,005 A | 6/1934 | Morton ........................ 91/49 |
| 2,001,190 A | 5/1935 | Ginter ........................ 417/399 |
| 2,626,085 A | 1/1953 | MacKinnon |
| 2,686,281 A | 8/1954 | Shum ........................ 318/122 |
| 2,928,574 A | 3/1960 | Wagner |
| 3,652,879 A | 3/1972 | Plunkett et al. |
| 3,818,255 A | 6/1974 | Wagner |
| 3,829,721 A | 8/1974 | Rosenthal, Jr. |
| 3,871,069 A | 3/1975 | Grieb |
| 3,959,677 A | 5/1976 | Grieb |
| 3,995,703 A | 12/1976 | Wanner |
| 4,094,365 A | 6/1978 | Wanner |
| 4,257,540 A | 3/1981 | Wegmann et al. |
| 4,272,996 A | 6/1981 | Sauerwein |
| 4,276,941 A | 7/1981 | Wanner et al. |
| 4,314,170 A | 2/1982 | Sahrbacker |
| 4,639,202 A | 1/1987 | Mahanay et al. ............. 418/89 |
| 4,893,995 A | 1/1990 | Hufstader |
| 5,052,497 A | 10/1991 | Houben et al. |
| 5,105,912 A | 4/1992 | Heister |
| 5,113,951 A * | 5/1992 | Houben et al. ............... 173/75 |
| 5,404,967 A | 4/1995 | Barry |
| 5,609,274 A | 3/1997 | Shih et al. |
| 5,614,774 A | 3/1997 | McCallops et al. |
| 5,624,000 A | 4/1997 | Miller |
| 5,685,462 A | 11/1997 | Barry |
| 5,747,900 A | 5/1998 | Nakamura et al. |
| 5,780,946 A | 7/1998 | Nakamura et al. |
| 5,798,584 A | 8/1998 | Schaeffeler et al. |

(Continued)

*Primary Examiner*—Patrick Brinson
(74) *Attorney, Agent, or Firm*—Alston & Bird LLP (57) ABSTRACT

An apparatus converts rotary motion of a motor drive shaft into oscillatory motion of a work piece, for example, in a power tool. The apparatus comprises a planetary gear assembly connected to the motor for rotating an output gear. The output gear meshes with a drive gear including a drive pin. The drive pin fits in a yoke slot for reciprocation of the yoke upon rotation of the drive gear. The yoke is operatively connected to the work piece. An air flow system cools the power tool housing. The housing has an inlet aperture in the handle portion and an outlet aperture for placing the interior of the housing in communication with the atmosphere. A wall integral with the handle portion engages the body of the motor housing between a first end and openings in the body. The wall provides a barrier to minimize air flow between an intake air portion of the interior of the housing and an exhaust air portion. A fan on the motor drive shaft induces air flow from the intake air portion and exhaust air portion of the interior chamber into the motor housing through openings in the end walls. Air is discharged from the openings in the body.

6 Claims, 8 Drawing Sheets

U.S. PATENT DOCUMENTS

| | | | |
|---|---|---|---|
| 5,909,830 A | * | 6/1999 | Bates et al. .................. 222/327 |
| 5,911,281 A | | 6/1999 | Treskog et al. |
| 6,043,575 A | | 3/2000 | Ghode et al. |
| 6,113,360 A | | 9/2000 | Yu et al. ...................... 417/310 |
| 6,123,235 A | * | 9/2000 | Hsu ............................ 222/327 |
| 6,135,327 A | | 10/2000 | Post et al. |
| 6,226,877 B1 | | 5/2001 | Ono |
| 6,443,675 B1 | | 9/2002 | Kopras et al. |
| 2001/0004172 A1 | | 6/2001 | Sakurai et al. |
| 2002/0089240 A1 | | 7/2002 | Du |
| 2003/0212153 A1 | | 11/2003 | Gervais et al. ................ 521/50 |
| 2004/0045982 A1 | * | 3/2004 | Herman et al. .......... 222/145.5 |
| 2004/0231927 A1 | | 11/2004 | Huang et al. ............. 184/105.2 |

* cited by examiner

FIG. 11 ns like c₁.
GREASE GUN

BACKGROUND OF INVENTION

This invention generally relates to power tools and, more particularly, to portable, electrically-powered power tools, such as, for example, for pumping fluids as in a handheld battery-powered grease gun.

A conventional handheld battery-powered grease gun generally comprises a housing including a head portion and a handle portion extending transversely from the head. A cylindrical barrel holding a supply of grease is removably secured to the head and extends from the head alongside the handle. The head portion includes a pump mechanism including a piston that reciprocates in a bore that forms a pump cylinder. The head portion has an inlet port in communication with the bore and the material in the barrel and an outlet port at one end of the bore to a flexible hose for delivering grease to a point of lubrication.

An electric motor is accommodated in the housing and a gear transmission mechanism is provided between the motor and the pumping mechanism for changing the rotating motion of the motor output shaft to the linear reciprocating motion of the piston while reducing the rotational speed and increasing torque. The transmission of these type mechanisms usually ends in a rotary crank plate having an eccentrically located crank pin that is drivingly disposed within a slot of a reciprocating yoke coupled to the piston. This arrangement has been used primarily in jigsaws, which are the most common type of power tool employing reciprocating drive mechanism. Batteries to power the motor and the switch to control the operation of the power tool are also found in the housing.

In a battery-powered grease gun, the transmission is needed for dispensing grease under pressure. In order for the grease gun to perform satisfactorily, significant force must be exerted. This requirement has led to the development of large, heavy power transmission mechanisms, resulting in awkward and difficult to handle grease guns. The power requirement also reduces the life cycle of the rechargeable battery. Moreover, since the transmission drive system includes numerous components, the manufacturing is relatively complicated and costly.

Another problem that affects all power tools, including a battery-powered grease gun, is heat build-up within the housing during use of the power tool. Heat build-up can shorten the life of the motor and other moving parts and is particularly a problem when a housing is made of plastic. Thus, care must be taken to ensure good heat dissipation. For this reason, the electric motor used in power tools typically includes a fan for cooling air circulation. Conventionally, the fan is mounted on the motor armature shaft for generating air flow through openings in the motor and the tool housing. Vents in the tool housing facilitate air flow between the interior of the housing and the atmosphere. The need for good cooling air flow around the motor necessitates placing the motor in a position in the housing to allow sufficient air flow around and through the motor. Unfortunately, the motor position necessitates an arrangement that results in an unfavorably located center of gravity which does not facilitate overall handling of the power tool.

For the foregoing reasons, there is a need for a power transmission which is compact, yet efficient and powerful enough to be used in power tools, such as battery-powered grease gun. There is also a need for improved cooling in power tools so as to allow more convenient placement of the motor. Ideally, the motor could be positioned in the handle to further reduce the size and improve the handling of the power tool.

SUMMARY OF INVENTION

According to the present invention, an apparatus is provided for converting rotary motion of a drive shaft of a motor into oscillatory motion of a work piece. The motion converting apparatus comprises a planetary gear assembly operatively connected to the motor for rotating an output gear. The output gear meshes with a drive gear including a drive pin eccentrically mounted on a face of the drive gear. The drive pin is received in a cam slot of a yoke for reciprocation of the yoke by the drive pin upon rotation of the drive gear. The yoke is adapted to be operatively connected to the work piece.

Also according to the present invention, an apparatus is provided for dispensing a fluid. The fluid dispensing apparatus comprises a housing having a bore forming a pump cylinder. An inlet passage, in fluid communication with the fluid supply, and an outlet passage extend from the exterior of the housing and open into the bore. The outlet passage opens into the bore at a point axially spaced in a first direction from the opening of the inlet passage into the bore. An electric motor is disposed within the housing and means for energizing the motor is provided. A transmission is disposed within the housing and operably connected to the motor. The transmission comprises a planetary gear assembly including an output gear. The output gear meshes with a drive gear including a drive pin eccentrically mounted on a face of the drive gear. The drive pin is received in a cam slot of a yoke for reciprocation of the yoke by the drive pin upon rotation of the drive gear. A piston is fastened to the yoke at one end and the other end is slidably disposed in the bore for reciprocal movement relative to the housing. The piston is movable between a first position axially spaced in a second direction from the opening of the inlet passage into the bore and a second position past the inlet passage opening in the first direction. The piston moves through a pumping stroke toward the outlet passage opening in the first direction for forcing the fluid in the bore out through the outlet passage. In a return stroke, the piston moves away from the outlet passage opening and past the inlet passage opening in the second direction for priming the bore.

Further according to the present invention, a grease gun is provided comprising a housing including a handle portion and a head portion. The head portion has a bore forming a pump cylinder, and an inlet passage and an outlet passage extending from the exterior of the head portion and opening into the bore. The outlet passage opens into the bore at a point axially spaced in a first direction from the opening of the inlet passage into the bore. A grease supply cylinder is sealingly secured to the head portion so that the bore is in fluid communication with the grease in the supply cylinder. An electric motor is provided as well as means for energizing the motor. A transmission is operably connected to the motor. The transmission comprises a planetary gear assembly including an output gear and a drive gear meshing with the output gear. The drive gear includes a drive pin eccentrically mounted on a face of drive gear. The drive pin is received in a cam slot in a yoke for reciprocation of the yoke by the drive pin upon rotation of the drive gear. A piston is fastened to the yoke at one end and the other end of the piston is slidably disposed in the bore for reciprocal movement relative to the housing. The piston is movable between a first position axially spaced in a second direction from the opening of the inlet passage into the bore and a second position past the inlet passage opening in the first direction. The piston moves toward the outlet passage opening in the first direction through a pumping stroke for forcing the grease in the bore out through the outlet passage opening. The piston moves away from the outlet passage and past the inlet passage opening in the second direction through a return stroke for priming the bore.

According to another aspect of the present invention, an air flow system is provided for a power tool housing defining an interior chamber and including a handle portion. The housing has at least one air inlet aperture in the handle portion and at least one air outlet aperture for placing the interior chamber in communication with the atmosphere. The air flow system comprises an electric motor adapted to be disposed in the handle portion of the housing. The motor comprises a motor housing having a first end wall, a second end wall and a body interconnecting the end walls. A fan is fixed to the drive shaft within the motor housing for drawing air through the motor housing. A wall integral with the handle portion of the housing extends inwardly into the interior chamber. The wall engages the body of the motor housing between the first end wall and openings in the body so that the interior chamber is divided into a first intake air portion, wherein the openings in the first end wall are in fluid communication with the atmosphere through the at least one air inlet aperture, and a second exhaust air portion, wherein the openings in the body and the second end wall are in fluid communication with the atmosphere through the at least one air outlet aperture. The wall provides a barrier to minimize air flow between the intake air portion of the interior chamber and the exhaust air portion. In use, the fan induces air flow from the intake air portion of the interior chamber into the motor housing through openings in the first end wall and from the exhaust air portion of the interior chamber into the motor housing through openings in the second end wall. Air is discharged from the openings in the body.

Also according to another aspect of the present invention, a power tool is provided comprising a housing defining an interior chamber and including a handle portion. The housing has at least one air inlet aperture in the handle portion and at least one air outlet aperture for placing the interior chamber in communication with the atmosphere. An electric motor is disposed in the handle portion of the housing. The motor comprises a motor housing having a first end wall, a second end wall, a body interconnecting the end walls, and a drive shaft extending from the second end wall. A fan is fixed to the shaft within the motor housing for drawing air through the motor housing. A wall integral with the handle portion of the housing extends inwardly into the interior chamber and engages the body of the motor housing between the first end wall and openings in the body. The wall divides the interior chamber into a first intake air portion, wherein the openings in the first end wall are in fluid communication with the atmosphere through the at least one air inlet aperture, and a second exhaust air portion, wherein the openings in the body and the second end wall are in fluid communication with the atmosphere through the at least one air outlet aperture. The wall provides a barrier to minimize air flow between the intake air portion of the interior chamber and the exhaust air portion. In use, the fan induces air flow from the atmosphere through the at least one air inlet aperture in the handle portion and into the motor housing through openings in the first end wall and from the exhaust air portion of the interior chamber into the motor housing through openings in the second end wall. Air is discharged out of the openings in the body.

Further according to another aspect of the present invention, a grease gun is provided comprising a housing defining an interior chamber and having at least one air inlet aperture and at least one air outlet aperture for placing the interior chamber in communication with the atmosphere. The housing includes a handle portion having the at least one air inlet aperture, and a head portion extending transversely from one end of the handle portion. The head portion has a bore forming a pump cylinder. An inlet passage and an outlet passage extend from the exterior of the head portion and open into the bore, the outlet passage opening into the bore at a point axially spaced in a first direction from the opening of the inlet passage into the bore. An electric motor is disposed in the handle portion of the housing. The motor comprises a motor housing having a first end wall, a second end wall, a body interconnecting the end walls, and a drive shaft extending from the second end wall. A fan is fixed to the shaft within the motor housing for drawing air through the motor housing. A wall integral with the handle portion of the housing extends inwardly into the interior chamber and engages the body of the motor housing between the first end wall and openings in the body. The wall divides the interior chamber into a first air intake portion, wherein the openings in the first end wall are in fluid communication with the atmosphere through the at least one air inlet aperture, and a second exhaust air portion, wherein the openings in the body and the second end wall are in fluid communication with the atmosphere through the at least one air outlet aperture. The wall provides a barrier to minimize air flow between the intake air portion of the interior chamber and the exhaust air portion. A grease supply cylinder is sealingly secured to the head portion so that the bore is in fluid communication with the grease in the supply cylinder. The cylinder extends laterally from the head portion such that the longitudinal axis of the cylinder is substantially parallel to the longitudinal axis of the handle. A battery is received within the handle portion for energizing the motor. In use, the fan induces air flow from the atmosphere through the at least one air inlet aperture in the handle portion and into the motor housing through openings in the first end wall and from the exhaust air portion of the interior chamber into the motor housing through openings in the second end wall. Air is discharged out of the openings in the body.

BRIEF DESCRIPTION OF DRAWINGS

For a more complete understanding of the present invention, reference should now be had to the embodiments shown in the accompanying drawings and described below. In the drawings.

DETAILED DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

Referring now to the drawings, wherein like reference numerals designate corresponding or similar elements throughout the several views, an embodiment of the present invention is shown in the form of a battery-powered grease gun, designated generally at 20. It is understood that, although the present invention will be described in detail herein with reference to the exemplary embodiment of the battery-powered grease gun 20, the present invention may be applied to, and find utility in, other portable, hand-held power tools. As described above, electric motors are used in a wide variety of applications involving power tools such as, for example, drills, saws, sanding and grinding devices, yard tools such as, for example, edgers and trimmers, and the like. Further, although the present invention will be described in detail herein as embodied in a power tool wherein rotating motion of the electric motor is converted to linear reciprocating motion, it is not intended to be so limited. The present invention may be used in rotary power tools, such as power drills, screw drivers, and the like, and in kitchen appliances such as, for example, mixers and blenders. Thus, the present invention has general applicability to any device powered by an electric motor wherein improvements in efficiency and cooling are desired.

Figure 1:
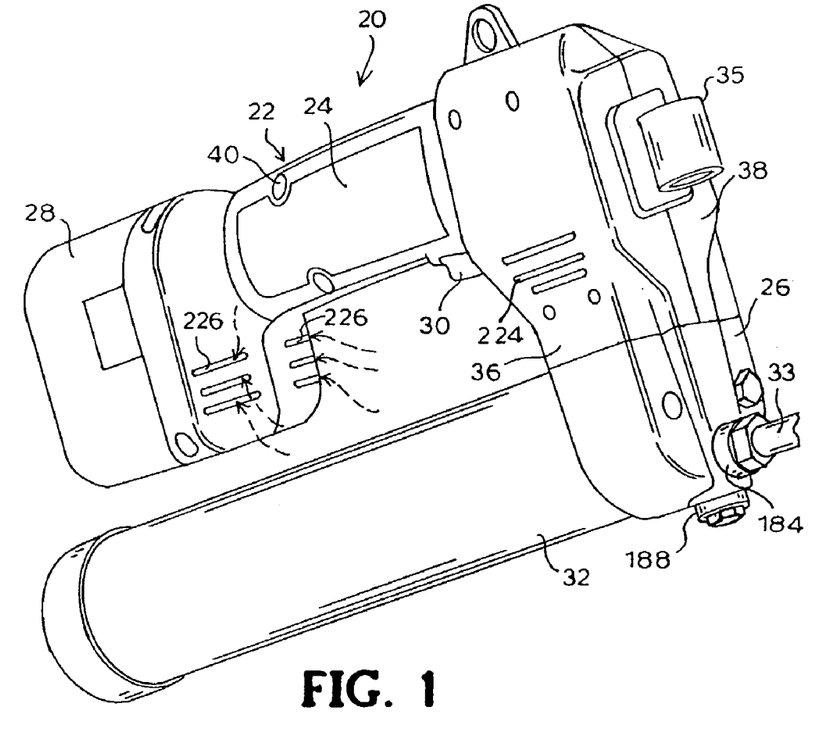
FIG. 1 is a perspective view of a battery-powered grease gun according to the present invention.

Referring now to FIG. 1, the grease gun 20 comprises a housing 22, including a rear handle portion 24 and a front head portion 26. The housing 22, as viewed from the side, is generally L-shaped with the handle 24 extending transversely from an upper end of the head 26. The handle 24 is generally tubular and of a length somewhat greater than the width of a human hand, and of a girth such that the handle 24 may be readily grasped in the hand of the user. The handle 24 may be contoured so that the handle 24 may be grasped comfortably. A rechargeable battery pack 28 is mounted to the housing 22 at the rear end of the handle 24. A manually operated trigger 30 extends from an opening in the side of the handle 24. In this position, the trigger 30 can be selectively operated by manual manipulation by the user gripping the handle 24 to control the flow of electric current from the battery pack 28 to an electric motor (not shown in FIG. 1) in the housing 22.

A tubular reservoir 32 is removably secured to the housing 22 at a lower end of the head 26 for holding a supply of grease. The reservoir 32 is aligned substantially parallel with the longitudinal axis of the handle 24. It is understood that the term substantially parallel as used in this context throughout this specification means more parallel than not. A discharge hose 33 extends from the lower end of the head 26 for delivering grease to desired points of lubrication. It is understood that a wide variety of fluids other than grease, or other lubricant, can be dispensed according to the present invention, such as, for example, sealants such as caulk, glue, cake frosting as well as other high viscosity fluids or semi-solid materials that require high pumping pressure to achieve adequate flow rates.

Figure 2:
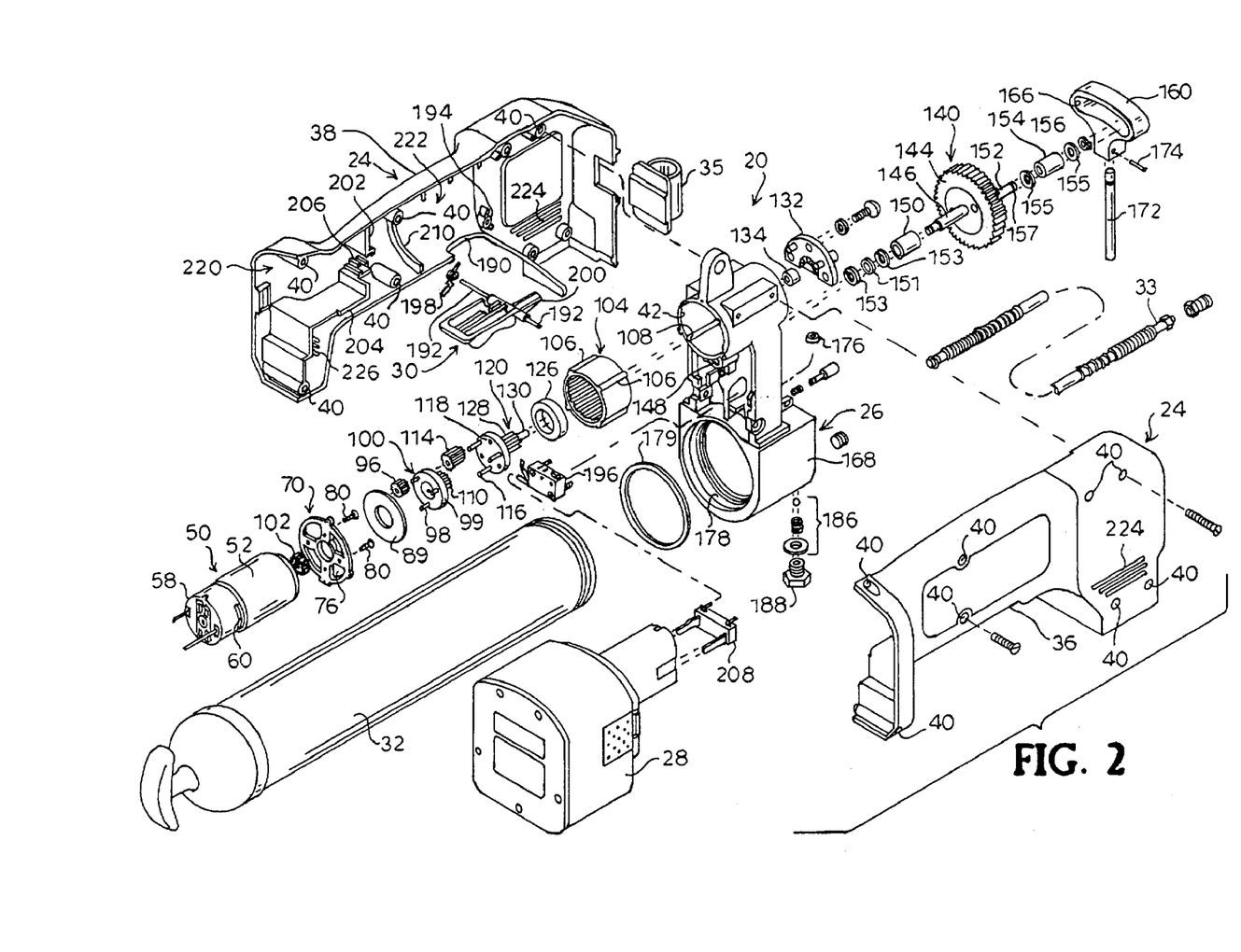
FIG. 2 is an exploded view of the battery-powered grease gun shown in FIG. 1.

As best seen FIG. 2, the handle 24 may be formed as two complementary, symmetric parts such that the handle 24 is in effect split in half along a central longitudinal plane forming a right hand handle part 36 and a left hand handle part 38, as viewed by the user holding the gun in his right hand with the head 26 at the top. The two handle parts 36, 38 are joined together in a conventional manner using fasteners, such as screws, an adhesive, welding, or a combination thereof. As depicted in the present embodiment, screw holes 40 are formed in the two handle parts 36, 38 for fastening the handle parts together. The handle 24 may be made of various materials, including plastics or metals. Preferably, the handle 24 is made of an electrically insulating material with low heat conductivity, such as hard plastic.

The head 26 is generally a rectangular shape with rounded corners and parallel side walls extending between and interconnecting irregular front and rear walls. The upper end of the head 26 has a cylindrical passthrough opening 42. The head 26 is preferably a metal casting.

Figure 3:
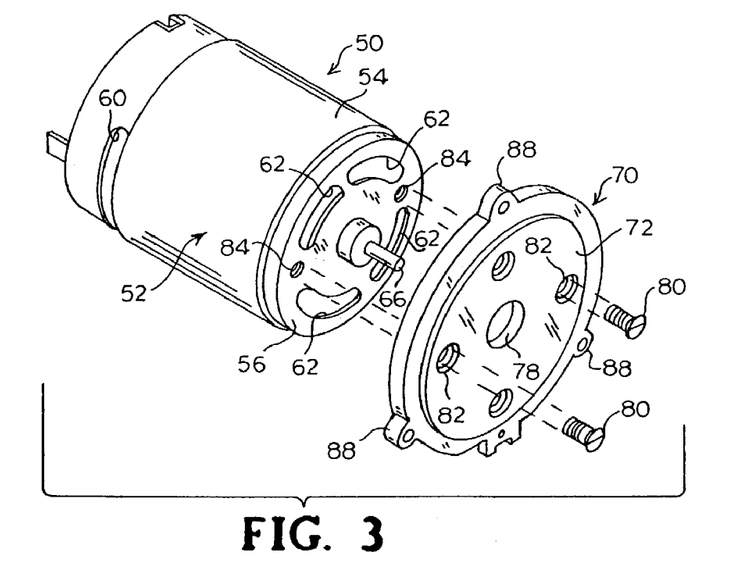
FIG. 3 is an exploded perspective view of an electric motor and mounting plate for use in the battery-powered grease gun according to the present invention.

Referring now to FIGS. 2 and 3, the electric motor 50 includes a substantially cylindrical motor housing 52 having a side wall 54 with an external surface, a front end wall 56 and a rear end wall 58. The side wall 54 has two diametrically opposed, circumferentially-extending air ports 60 opening at the external surface of the motor housing 52. The front end wall 56 has four spaced air ports 62. An axial rotary output shaft 66 extends from the front end wall 56 of the motor housing 52. A fan (not shown) is located within the motor housing 52 and attached to the motor shaft 66. Preferably, the fan is an impeller type fan.

Figure 4:
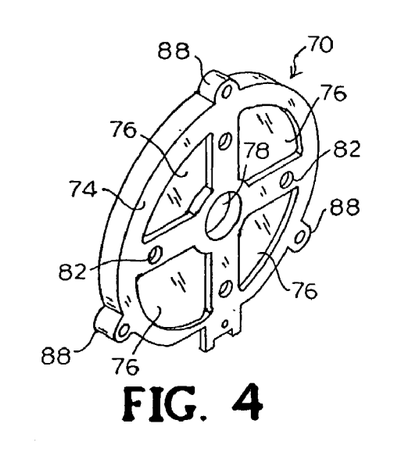
FIG. 4 is a perspective view from the other side of the mounting plate shown in FIG. 3.
Figure 5:
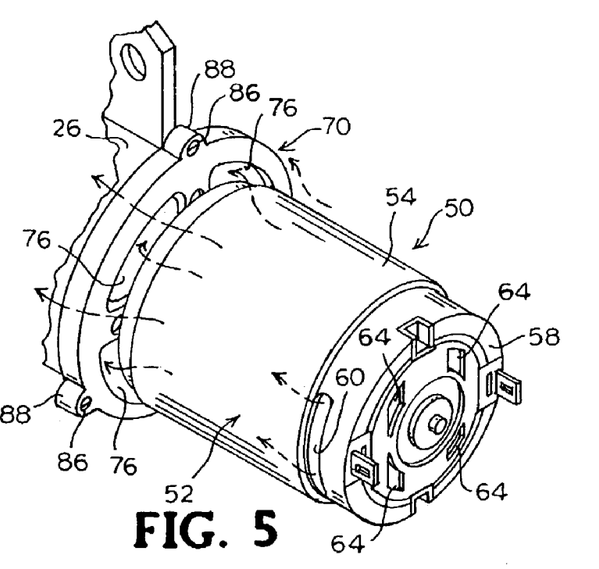
FIG. 5 is a perspective view of an electric motor mounted in the battery-powered grease gun according to the present invention, with surrounding components cut-away.
Figure 6:
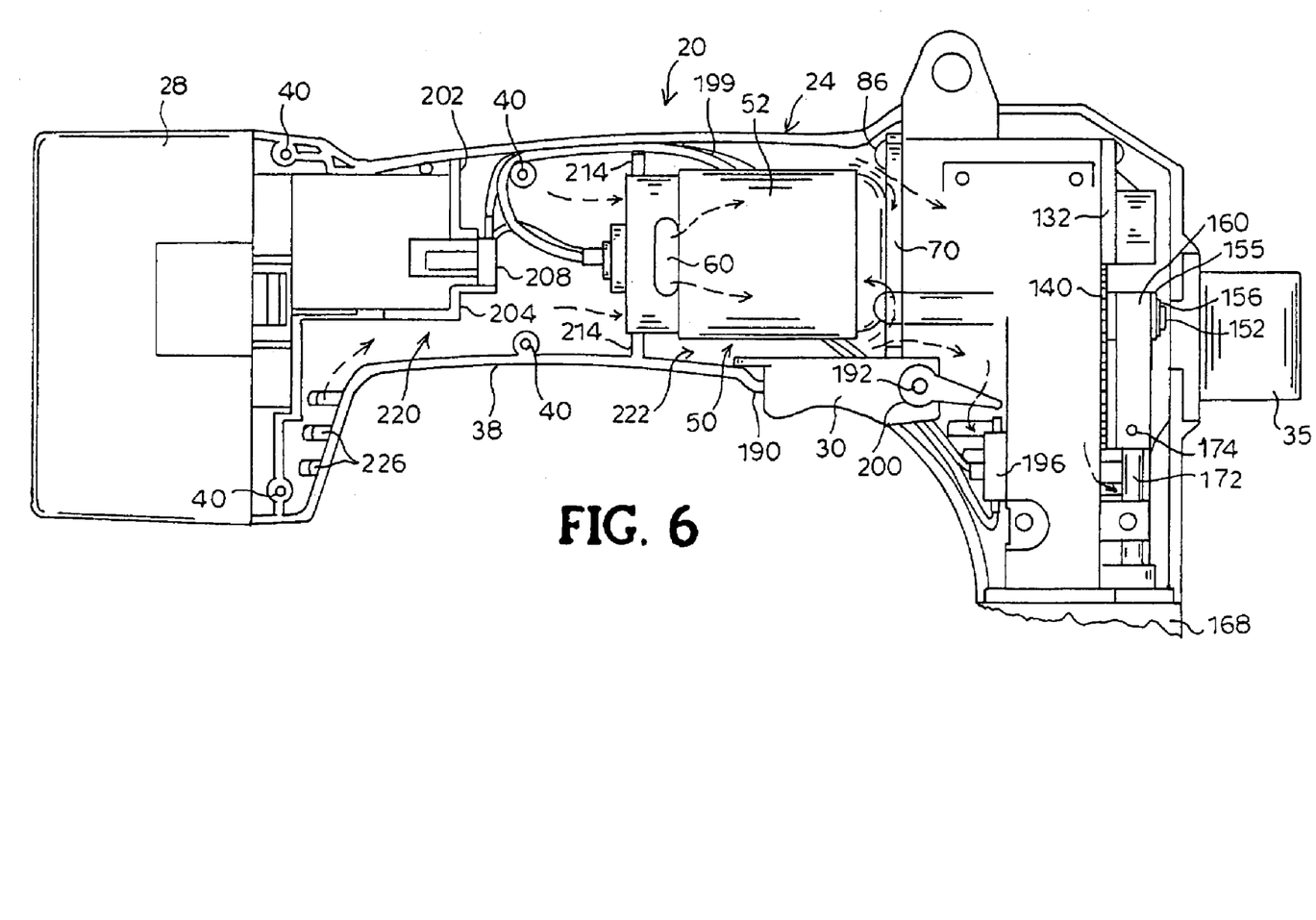
FIG. 6 is a side elevation fragmentary view of the battery-powered grease gun shown in FIG. 1 with the right handle part removed.

A circular mounting plate 70 is provided for securing the motor 50 in the handle 24. The mounting plate 70 has front surface 72 and a rear surface 74 (FIG. 4). The rear surface 74 of the mounting plate 70 has four circumferentially spaced recesses 76 having a substantially triangular shape. The mounting plate 70 is adapted to be fastened to the front end wall 56 of the motor housing 52 with the motor shaft 66 extending through a central opening 78 in the mounting plate 70. The mounting plate 70 is positioned relative to the motor housing 52 such that the apertures 76 in the rear surface 74 of the mounting plate 70 are aligned with the air ports 62 in the front end wall 56 of the motor housing 52. The mounting plate 70 is fastened to the motor housing 52 using screws 80 which pass through holes 82 in the mounting plate 70 and are received in threaded openings 84 in the front end wall 56. The motor housing 52 with attached mounting plate 70 is aligned with the opening 42 in the upper end of the head 26, as best seen in FIGS. 5 and 6. The mounting plate 70 is fastened to the head 26 using screws 86 which pass through openings in ears 88 circumferentially spaced on the periphery of the mounting plate 70 and are received in threaded openings in the head 26. The mounting plate 70 is large enough to cover the opening in the head portion. A washer 89 (FIG. 2) is positioned between the mounting plate 70 and head 26. As seen in FIG. 5, the rear end wall 58 of the motor housing 52 has four spaced air ports 64. When the motor 50 is operating, the fan rotates to draw air through the air ports 62, 64 in the front and rear end walls 56, 58 of the motor housing 52 to cool the motor 50. Warmed air is exhausted from the motor housing 52 through the side wall air ports 60. A suitable motor for use in a power tool according to the present invention is available from Johnson Electric Engineering Ltd. of Hong Kong, and sold as model number HC683LG.

Figure 7:
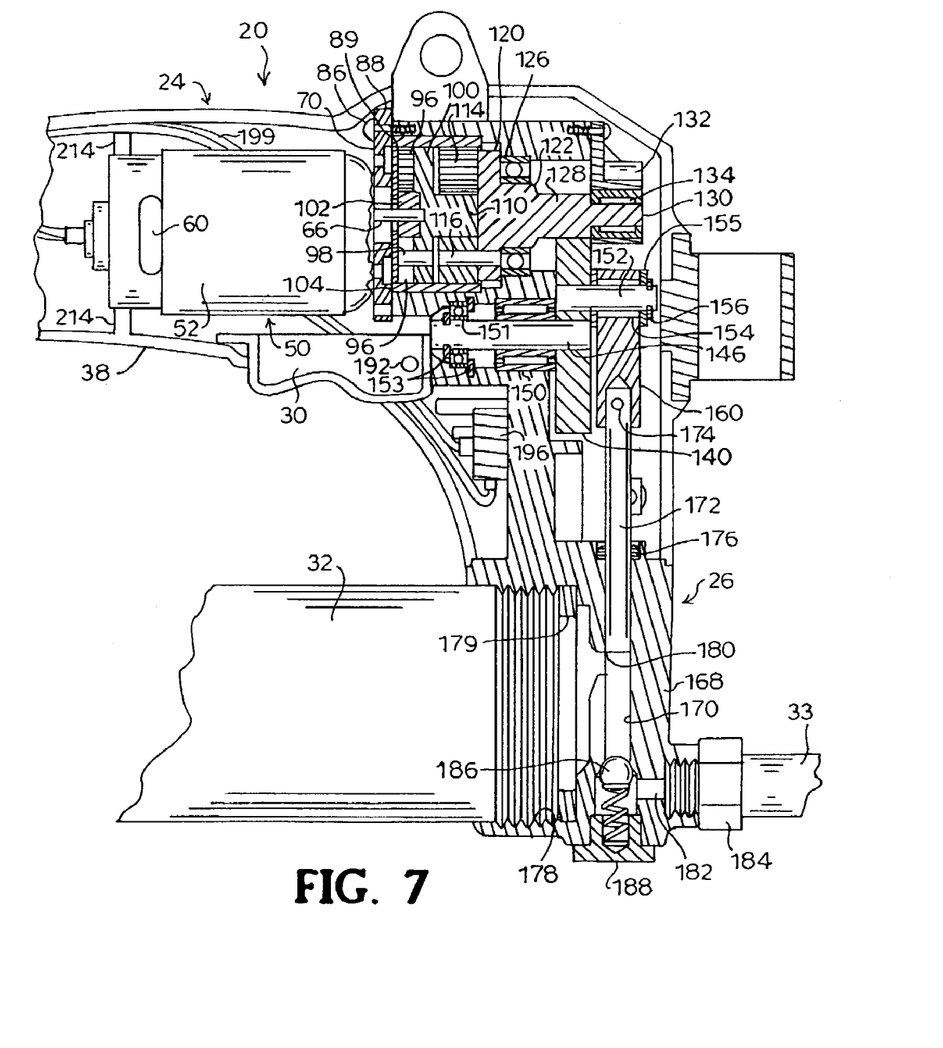
FIG. 7 is a partial cross-section fragmentary view of the battery-powered grease gun shown in FIG. 1.

The motor 50 drives a transmission that drives a pump assembly for pumping grease under pressure from the reservoir 32 through the discharge hose 33. In one embodiment of the present invention, the transmission comprises a planetary gear reduction system, preferably a two-stage planetary gear reduction system housed in the opening 42 in the upper end of the head 26, which serves as a gear housing. Referring to FIGS. 2 and 7, a first planetary gear set of the planetary gear system includes three planet gears 96 (only one of which is shown in FIG. 2) rotatably mounted on pins 98 extending from a rear surface 99 of a first carrier 100. A pinion gear 102 is press fit onto the distal end of the motor shaft 66 and forms a part of the transmission. The pinion gear 102 fits between and meshes with the three planet gears 96 on the first carrier 100. The three planet gears 96 also mesh with an orbit gear 104 fixed in the opening 42 in the head 26. The orbit gear 104 has four longitudinal ridges 106 (FIG. 2) circumferentially spaced about the periphery. The head 26 has corresponding longitudinal slots 108 formed in the wall defining the upper opening 42 for non-rotatably receiving the orbit gear 102.

A sun gear 110 is axially mounted to a front surface of the first carrier 100 for rotation with the first carrier. The sun gear 110 meshes with and drives three planet gears 114 (only one of which is shown in FIG. 2) of a secondary planetary gear set of the transmission. The second set of planet gears 114 are rotatably mounted on pins 116 extending from a rear surface 118 of a second carrier 120 and also mesh with the orbit gear 104. An axial reduced diameter shoulder 122 extends forwardly from a front surface of the second carrier 120. A roller bearing 126 is positioned between the cylindrical peripheral surface of the shoulder 122 and the interior surface of the head 26. An output gear 128 is fixed to the second carrier 120 at a front surface of the shoulder 122 for rotation with the second carrier 120. An axial shaft 130 extends from the spur gear 128 and is received in a bore in a semi-circular bracket 132 fastened to the front wall of the head 26. The shaft 130 is supported for rotation in the bracket 132 by a needle bearing 134.

A drive gear 140 is provided at the forward end of the transmission. An axial shaft 146 extends from a rear surface 144 of the drive gear 140 and is rotatably received in a passthrough axial bore 148 in the head 26 below the upper opening 42. The axial shaft 146 is supported in the bore 148 by a needle bearing 150 and a ball bearing 151 positioned between two retaining clips 153. The front clip 153 fits in a groove in the interior surface of the bore 148 for maintaining the ball bearing 151 in the bore 148. The rear clip 153 fits in a groove in the shaft 146 for maintaining the axial position of the shaft 146. An eccentrically mounted shaft 152 extends transversely from the front surface of the drive gear 140. A hollow cylindrical drive pin 154 is mounted for rotation on the eccentric shaft 152 between two washers 155. A retaining clip 156 fits into a groove 157 in the end of the shaft 152 to hold the drive pin 154 in place.

Figure 8:
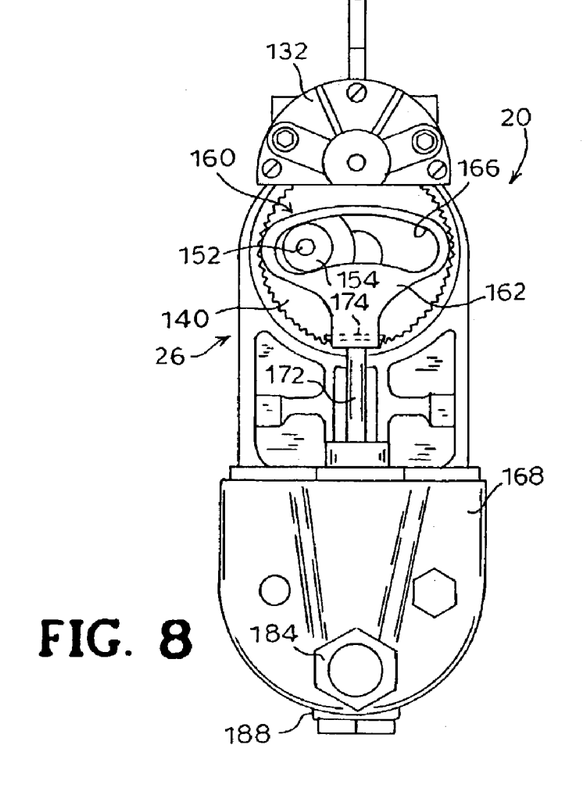
FIG. 8 is an end elevation view of the battery-powered grease gun shown in FIG. 1 with the handle portion of the housing removed.

As shown in FIGS. 7 and 8, a yoke 160 is positioned adjacent to the front surface of the drive gear 140. The yoke 160 is substantially heart-shaped. A curved oblong cam slot 166 is formed in the yoke 160. The cam slot 166 is dimensioned to receive the drive pin 154, allowing sufficient room to enable the drive pin 154 to slide freely through the cam slot 166 from end to end. As depicted in the Figures, a scotch yoke design having a track configuration that minimizes the side load forces imposed on the yoke 160 is preferred. However, it is understood tat the configuration of the cam slot 166 may be straight, with the length of the slot 166 equal to the diameter of the circle traced by the drive pin 154.

Referring again to FIG. 7, the pump assembly comprises a pump chamber 168 including the lower end of the head 26. The pump chamber 168 defines a cylindrical bore 170 which, as will be described below, is in fluid communication with the reservoir 32 of grease and the discharge hose 33. The pump chamber bore 170 receives a plunger 172 in sliding engagement with the interior surface of the bore 170. The plunger 172 extends upwardly through an opening in the pump chamber 168. The distal end of the plunger 172 is received in an opening in the yoke 160 and secured in place with a pin 174. A resilient seal 176 is positioned in an annular recess in the opening in the pump chamber 168 and surrounds the plunger 172 for sealing the pump chamber 168.

The pump chamber 168 has a circular threaded flange 178 that is internally threaded for receiving an externally threaded open end of the reservoir 32. A gasket 179 is seated between the head 26 and the reservoir 32 for sealing the connection. The operation of the grease reservoir 32 may be typical of a conventional grease gun that is either manually or battery-powered. Therefore the interior of the reservoir 32 is not shown in the drawings. The grease supply in the reservoir 32 is in fluid communication with the bore 170 via an inlet passage 180 formed in the pump chamber 168 and extending from the recess 178 and opening into the bore 170. An outlet passage 182 is spaced downward from the inlet passage 180 and extends from the bore 170 to a fitting 184 to which the discharge hose 33 is connected. A ball check valve assembly 186 is positioned in the pump chamber 168 at the end of the bore 170, and is held in place by a threaded plug 188.

As shown in FIGS. 2 and 7, the handle 24 has an opening 190 to accommodate the trigger 30. The trigger 30 has transverse arms 192 that rotatably fit into opposed bosses 194 in the handle 24 so that the trigger 30 will pivot relative to the handle 24. A paddle 200 extends forwardly from one of the trigger arms 192. An electrical switch 196 is mounted in the handle 24 adjacent to the trigger 30. A torsion spring 198 is mounted around one of the trigger arms 192. One end of the spring 198 engages the trigger 30 and the other of the spring engages the interior of the handle 24 for biasing the trigger 30 outwardly of the handle and away from the switch 196 in an off position. Two wires carry power from the battery pack 28 to the motor 50. When the trigger 30 is actuated by the user, the trigger 30 pivots inwardly against the biasing action of the spring 198. The paddle 200 contacts the switch 196 for moving the switch to an on position. When the user releases the trigger 30, the spring 198 operates to pivot the trigger 30 back to the off position.

In use, the user grips the handle 24 and manually manipulates the trigger 30 to energize the motor 50, rotating the motor shaft 66 and pinion gear 102. Rotation of the pinion gear 102 is transmitted through the transmission causing the drive gear 140 to rotate at a reduced speed of rotation and at an increased torque from that of the pinion gear 102. The rotation of the drive gear 140 is transmitted to the yoke 160 by the action of the drive pin 154 engaging the inside peripheral surface of the cam slot 166 for reciprocating the yoke 160 and plunger 172.

The plunger 172 reciprocates in the bore 170 of the pump chamber 168 through a pressure stroke and a return stroke. On the pressure stroke, the plunger 172 moves in the bore 170 in a downward direction, as seen in FIG. 7, past the inlet passage 180 and toward the outlet passage 182. Grease in the bore 170 is thus pushed toward the outlet passage 182. Pressure on the grease increases until the ball check valve 186 is unseated and grease under pressure passes through the outlet passage 182 and is discharged through the hose 33. Once the pressure stroke has been completed, the plunger 172 is retracted upward, as seen in FIG. 7, away from the outlet passage 182 and back across the inlet passage 180 thereby allowing more grease to enter into the bore 170.

As best seen in FIGS. 7 and 8, the bracket 132 partially closes the opening in the upper end of the head 26. This maintains the axial relationship of the components of the transmission and resists any tendency of the drive gear 140 to tilt or skew relative to its central axis due to forces exerted by the yoke 160 against the drive pin 154 during rotation of the drive gear 140. As described above, it is understood that other power tools may use this transmission arrangement, including tools with rotating drives wherein rotary movement may continue through to a chuck which is adapted to drive a suitable bit or implement that comes into engagement with the work.

Figure 9:
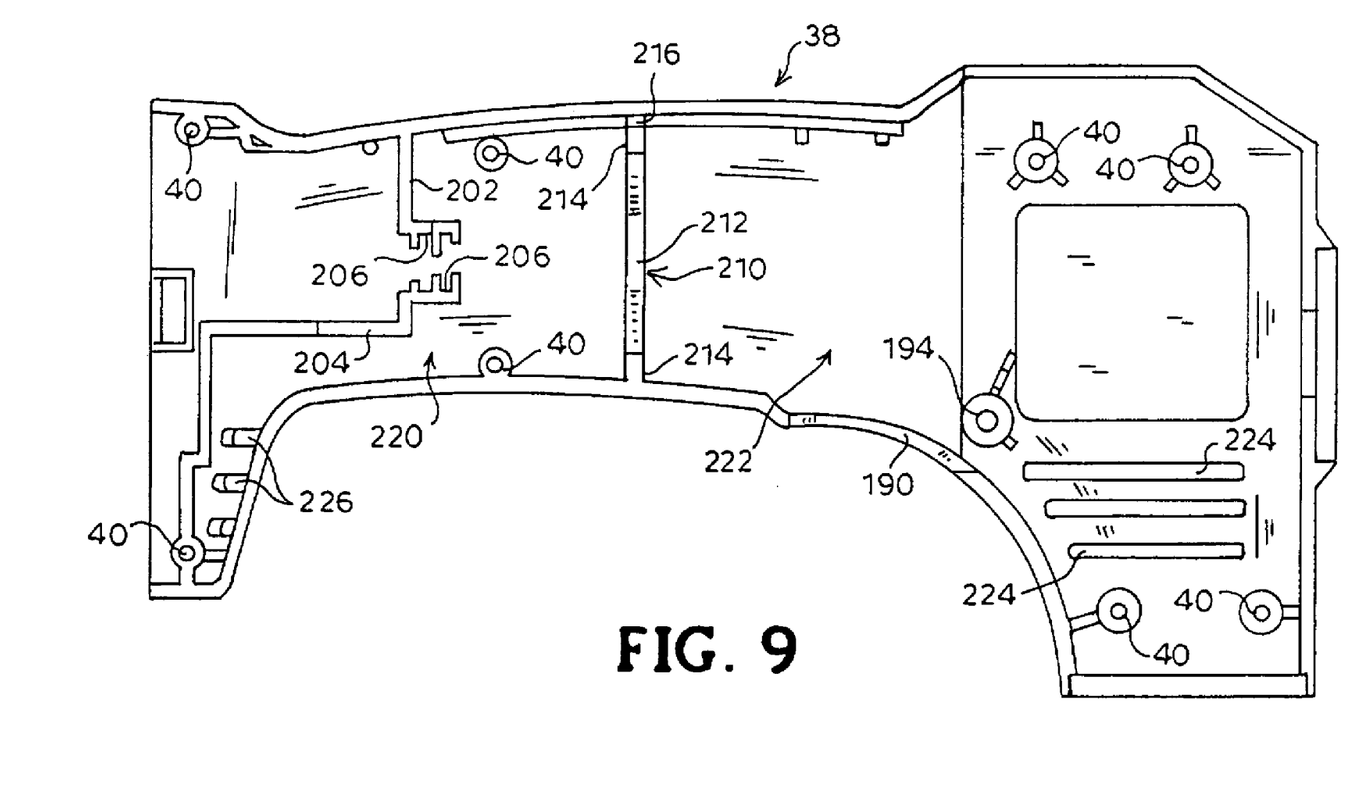
FIG. 9 is a side elevation view of a left hand handle part for use in the battery-powered grease gun according to the present invention.

FIG. 9 shows the interior of the left hand handle part 38. It is understood that the interior of the right hand handle part 36 is a mirror image of the left hand handle part 38. The left hand handle part 38 includes inwardly projecting integral walls. An upper battery socket wall 202 and a lower battery socket wall 204 are formed at the rear end of the handle parts 38 and are configured to accommodate the battery pack 28. The inner ends of the battery socket walls 202, 204 have transverse slots 206 for receiving a contact assembly 208 for connection to the battery pack 28. A partition wall 210 extends radially inward in the handle 24 forward of the battery socket walls 202, 204. The partition wall 210 has a central semi-circular cutout 212. The internal walls of the handle 24 provide strength and rigidity to the handle 24.

Figure 10:
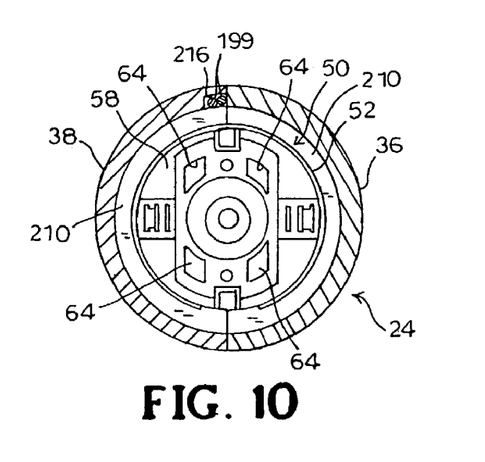
FIG. 10 is a cross section of the handle portion of the housing of the battery-powered grease gun shown in FIG. 1 and taken along line 10—10 of FIG. 11.
Figure 11:
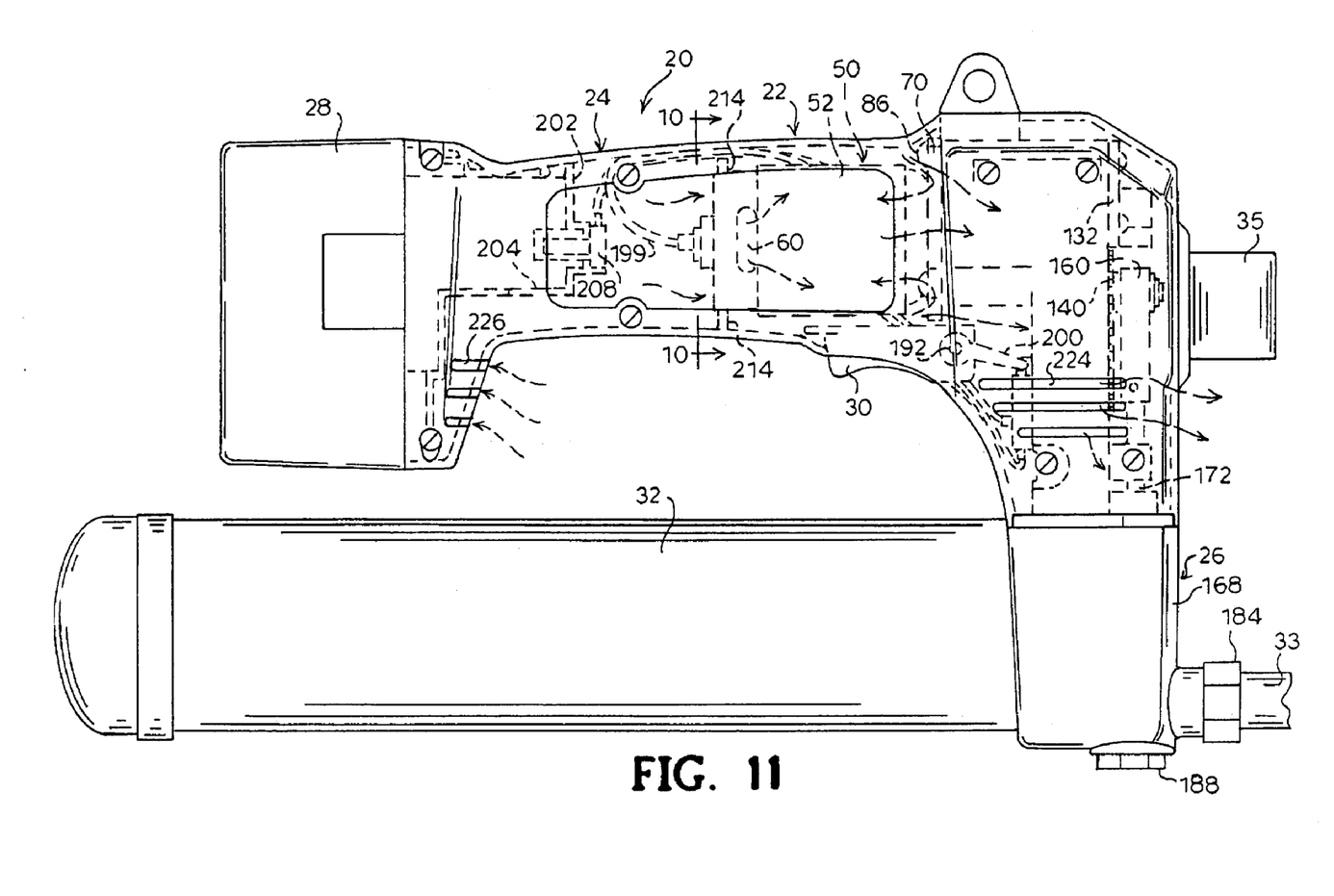
FIG. 11 is a side elevation view of the battery-powered grease gun shown in FIG. 1 with the internal components shown in phantom to depict air flow through the housing during operation of the battery-powered grease gun according to the present invention.

When the handle parts 36, 38 are assembled, the entire length of the battery socket walls 202, 204 and the straight lengths 214 of the partition walls 210 contact one another. The semi-circular cutouts 212 of the partition wall 210 define a central opening in the handle 24 which surrounds and seals against the periphery of the side wall 54 of the motor housing 52. As best seen in FIGS. 7 and 10, the partition walls 210 seal against the motor housing 54 adjacent to and rearward of the air ports 60 in the side wall 54. A slot 216 is formed in the partition wall 210 for allowing the wires 199 from the contact assembly 208 to pass. The slot 216 is sized to minimize clearance between the wires 218 and the partition 210 (FIG. 9).

The partition wall 210 divides the interior of the handle 24 into two separate chambers when the handle parts 36, 38 are joined. Specifically, a chamber 220 is formed in the rear portion of the handle 24 upstream of the motor 50. The upstream chamber 220 is defined by the interior surface of the rear portion of the handle 24, the partition wall 210 and the upper and lower battery socket walls 202, 204. Forward of the partition wall 210 is an exhaust air chamber 222 defined by the interior surface of the forward portion of the handle 24, the partition wall 210 and the exterior surface of the head 26. Air vents 224, 226 are formed in the front portion and rear portion of the handle 24. The exhaust chamber 222 and the upstream chamber 220 are in communication with the atmosphere via the vents 224, 226 in the front and rear portions of the handle, respectively.

Air flow through the housing 22 is generated by rotation of the fan on the motor shaft 66 when the motor is running. Referring to FIGS. 1, 5, 6 and 11, dotted lines with arrows in the Figures show the direction of air flow through the housing 22. The motor fan draws ambient air from outside of the housing 22 through the inlet air vents 226 in the rear portion of the handle 24. Air flows forwardly into the inlet ports 64 in the rear end wall 58 of the motor housing 52. The partition wall 210 directs substantially all of the air drawn into the rear portion of the handle 24 into the motor housing 52 for cooling the motor 50. As described above, air flows through the motor 50 and is discharged from the ports 60 in the side wall 54 into the exhaust chamber 222.

A portion of the warmed air exiting the motor housing 52 through the exhaust ports 60 flows along the outer surface of the motor housing 52, into the ports 62 in the front end wall 56 and again through the motor housing 52 to be discharged from the side wall ports 60. The remainder of the exhausted air flows lengthwise of the handle 24 cooling the exhaust chamber 222 of the handle 24 and head 26 prior to exiting the housing 22 through the outlet vents 224 to the ambient. The periphery of the motor housing 52 and mounting plate 70 do not extend to the interior surface of the handle 24 for defining an annular space between the periphery of the motor housing 52 and mounting plate 70 and the interior surface of the handle 24 for the passage of air. The partition wall 210 substantially prevents the recirculated exhaust air from returning to the upstream chamber 220 in the rear portion of the handle 24. Where the cross-sectional area of the mounting plate 70 is greater than the cross-sectional area of the motor housing 52, as in the embodiment of the present invention shown in the Figures, the mounting plate 70 may function to deflect a portion of the motor exhaust air radially of the motor housing 52 (FIG. 6). The recesses 76 in the mounting plate 70 induce a portion of the deflected air to flow into the ports 62 in the front end wall 56.

It is understood that the structure of the interior of the handle 24 generally confines the air flow through the housing 22 to the path described. The channeled air flow acts to cool the motor 50 to a sufficiently low temperature to prevent excessive heat buildup in the motor housing 52 and handle 24, which would otherwise be detrimental to either the motor 50 or the housing 22, particularly a plastic housing, and cause discomfort to the user. This extends the life of the tool components. Moreover, this arrangement allows the placement of the motor 50 in the handle 24 of the grease gun 20. Placing the motor 50, battery pack 28, and transmission in the handle provides a compact, balanced design for any power tool. In a grease gun, wherein the handle 24 is oppositely positioned relative to the grease reservoir 32, a weight distribution is now available that enables the grease gun 20 to be more easily manipulated while gripping the handle 24.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teaching. For example, any number of planetary gear stages could be used in the transmission depending on the motor construction. Further, the handle construction channeling air flow can be used in a power tool that does not use a planetary gear system in the transmission. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in tat a nail employs a cylindrical surface to secure wooden parts together; whereas a screw employs a helical surface, in the environment of fastening wooden parts a nail and a screw may be equivalent structures.

What is claimed is:

1. A grease gun, comprising:
   a housing defining an interior chamber and having at least one air inlet aperture and at least one air outlet aperture for placing the interior chamber in communication with the atmosphere, the housing including;
      a handle portion having the at least one air inlet aperture, and
      a head portion extending transversely from one end of the handle portion, the head portion having a bore fanning a pump cylinder and an inlet passage and an outlet passage extending from the exterior of the head portion and opening into the bore, the outlet passage opening into the bore at a point axially spaced in a first direction from the opening of the inlet passage into the bore;
   an electric motor disposed in the handle portion of the housing, the motor comprising:
      a motor housing having a first end wall, a second end wall and a body interconnecting the end walls, the end walls and the body having openings into the motor housing,
      a drive shaft extending from the second end wall, and
      a fan fixed to the shaft within the motor housing for drawing air through the motor housing;
   a wall integral with the handle portion of the housing and extending inwardly into the interior chamber, the wall engaging the body of the motor housing between the first end wall and the openings in the body so that the interior chamber is divided into a first air intake portion wherein the openings in the first end wall are in fluid communication with the atmosphere through the at least one air inlet aperture and a second exhaust air portion wherein the openings in the body and the second end wall are in fluid communication with the atmosphere through the at least one air outlet aperture, the wall providing a barrier to minimize air flow between the intake air portion of the interior chamber and the exhaust air portion;
   a grease supply cylinder sealingly secured to the head portion so that the bore is in fluid communication with the grease in the supply cylinder, the supply cylinder extending laterally from the head portion such that the longitudinal axis of the supply cylinder is substantially parallel to the longitudinal axis of the handle; and
   a battery received within the handle portion for energizing the motor,
   wherein the fan induces air flow from the atmosphere through the at least one air inlet aperture in the handle portion and into the motor housing through the openings in the first end wall and from the exhaust air portion of the interior chamber into the motor housing through the openings in the second end wall and discharges the air out of the openings in the body.

2. A grease gun as recited in claim 1, further comprising a mounting plate mounted within the housing and having a first major surface and a second major surface and an edge wall extending between and interconnecting the first and second surfaces, the mounting plate secured to the second end wall of the motor so that the first major surface of the mounting plate faces the second end wall in spaced relationship and the motor shaft extends through an opening in the mounting plate, the cross-sectional area of the mounting plate being greater than the cross-sectional area of the second end wall but less than the cross-sectional area of the interior of the handle portion so that at least a portion of the edge wall of the mounting plate is spaced from the interior surface of the handle for defining a passage for air flow between the edge wall of the mounting plate and the interior surface of the handle, wherein the mounting plate deflects a portion of the discharged air into the openings in the second end wall.

3. A grease gun as recited in claim 1, further comprising a mounting plate adapted to be mounted within the housing and having a first major surface and a second major surface and an edge wall extending between and interconnecting the first and second surfaces, the mounting plate secured to the second end wall of the motor so that the first major surface of the mounting plate laces the second end wall in spaced relationship and the motor shaft extends through an opening in the mounting plate, the first major surface of the mounting plate having a plurality of spaced recesses for radially redirecting air flow toward the second end wall and into the openings in the second end wall.

4. A grease gun as recited in claim 1, further comprising a mounting plate mounted within the housing and having a surface directed toward the second end wall of the motor housing and configured to deflect a portion of the air discharged out of the openings in the body of the motor housing into the openings in the second end wall.

5. A grease gun as recited in claim 1, wherein the electric motor is disposed in the handle portion of the housing between the battery and the head portion of the housing.

6. A grease gun as recited in claim 1, wherein the motor shaft extends from the motor in a third direction, and the grease supply cylinder is configured to dispense the grease in substantially the third direction through the inlet passage to the bore.

* * * * *

UNITED STATES PATENT AND TRADEMARK OFFICE
Certificate

Patent No. 7,004,357 B2            Patented: February 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jerry D. Shew, Charlotte, NC (US); David Khiam Keong Sia, Kowloon (HK); and Raymond Wai Man Wong, Vaucluse (AU).

Signed and Sealed this Fourteenth Day of August 2012.

*KEVIN P. SHAVER*
*Supervisory Patent Examiner*
*Art Unit 3754*
*Technology Center 3700*